(12) United States Patent
Alaimo et al.

(10) Patent No.: US 12,335,591 B2
(45) Date of Patent: Jun. 17, 2025

(54) CAMERA MODULE SUBSTRATE DESIGNS

(71) Applicant: Apple Inc., Cupertino, CA (US)

(72) Inventors: Angelo M. Alaimo, San Jose, CA (US);
Wassim Ferose Habeeb Rakuman, Sammamish, WA (US); Bohan Hao, Santa Clara, CA (US); Ya-Wen Hsu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 18/101,950

(22) Filed: Jan. 26, 2023

(65) Prior Publication Data
US 2024/0107148 A1    Mar. 28, 2024

Related U.S. Application Data

(60) Provisional application No. 63/409,595, filed on Sep. 23, 2022.

(51) Int. Cl.
*H04N 23/57* (2023.01)
*G03B 30/00* (2021.01)
*H04N 23/51* (2023.01)
*H04N 23/54* (2023.01)

(52) U.S. Cl.
CPC ............. *H04N 23/57* (2023.01); *G03B 30/00* (2021.01); *H04N 23/51* (2023.01); *H04N 23/54* (2023.01)

(58) Field of Classification Search
CPC ........ H04N 23/57; H04N 23/51; H04N 23/54; G03B 30/00
USPC ........................................................ 348/374
See application file for complete search history.

(56) References Cited

U.S. PATENT DOCUMENTS

| | | |
|---|---|---|
| 5,761,543 A | 6/1998 | Yamada |
| 6,477,326 B1 | 11/2002 | Partynski |
| 6,593,558 B1 | 7/2003 | Edgar |
| 6,788,461 B2 | 9/2004 | Kurtz et al. |
| 7,490,779 B2 | 2/2009 | Shinozaki |
| 7,934,836 B2 | 5/2011 | Ito |
| 8,259,203 B2 | 9/2012 | Baldwin |
| 8,355,042 B2 | 1/2013 | Lablans |
| 8,553,106 B2 | 10/2013 | Scarff |
| 8,737,830 B2 | 5/2014 | Cheng et al. |
| 8,988,564 B2 | 3/2015 | Webster et al. |

(Continued)

OTHER PUBLICATIONS

U.S. Appl. No. 17/948,054, filed Sep. 19, 2022, Rayankula et al.
U.S. Appl. No. 17/950,927, filed Sep. 22, 2022, Williams et al.

*Primary Examiner* — Joel W Fosselman
(74) *Attorney, Agent, or Firm* — Brownstein Hyatt Farber Schreck, LLP

(57) ABSTRACT

Camera modules and associated electronic devices and systems are described. A camera module may include a set of housing elements that at least partially defines an interior cavity, a set of lens elements, an image sensor positioned within the interior cavity to receive light through the set of lens elements, and a substrate assembly. The substrate assembly may include a set of rigid substrates, a first set of electrical contacts positioned on a first surface of the set of rigid substrates, and a second set of electrical contacts positioned on a second surface of the set of rigid substrates. The substrate assembly may be positioned such that a first portion of the substrate assembly is positioned inside the interior cavity and a second portion of the substrate assembly extends outside of the interior cavity.

19 Claims, 14 Drawing Sheets

(56) References Cited

U.S. PATENT DOCUMENTS

| | | |
|---|---|---|
| 9,465,221 B2 | 10/2016 | Webster et al. |
| 9,632,279 B2 | 4/2017 | Chen |
| 9,686,531 B2 | 6/2017 | Ko et al. |
| 9,968,285 B2 | 5/2018 | Valsan et al. |
| 10,257,433 B2 | 4/2019 | Eromäki |
| 10,264,188 B2 | 4/2019 | Miller et al. |
| 10,298,913 B2 | 5/2019 | Shpunt et al. |
| 10,475,171 B2 | 11/2019 | Mrdjen et al. |
| 10,779,734 B2 | 9/2020 | Fengler et al. |
| 10,820,790 B2 | 11/2020 | Nagae |
| 11,328,150 B2 | 5/2022 | Fan |
| 11,457,133 B2 | 9/2022 | Attar |
| 11,736,784 B2 | 8/2023 | Kiniwa et al. |
| 11,754,684 B2 | 9/2023 | Garan |
| 2005/0051728 A1 | 3/2005 | Miyauchi |
| 2006/0022290 A1* | 2/2006 | Chen ................. H01L 27/14618 |
| | | 257/434 |
| 2009/0303317 A1 | 12/2009 | Tesar |
| 2010/0033813 A1 | 2/2010 | Rogoff |
| 2010/0079587 A1 | 4/2010 | Yoshida |
| 2011/0134303 A1* | 6/2011 | Jung ..................... H04N 23/50 |
| | | 257/E31.127 |
| 2011/0190639 A1 | 8/2011 | Peltie et al. |
| 2013/0141541 A1 | 6/2013 | Jung et al. |
| 2013/0242057 A1 | 9/2013 | Hong et al. |
| 2014/0066781 A1 | 3/2014 | Park et al. |
| 2017/0020377 A1 | 1/2017 | Takeuchi et al. |
| 2021/0052149 A1 | 2/2021 | Fukumoto et al. |
| 2021/0168269 A1 | 6/2021 | Wheatley et al. |
| 2021/0302589 A1 | 9/2021 | Takeuchi |
| 2022/0030173 A1 | 1/2022 | Noh et al. |
| 2024/0106305 A1 | 3/2024 | Williams et al. |
| 2024/0107136 A1 | 3/2024 | Rayankula et al. |

\* cited by examiner

CAMERA MODULE SUBSTRATE DESIGNS

CROSS-REFERENCE TO RELATED APPLICATION

This application is a nonprovisional and claims the benefit under 35 U.S.C. § 119(e) of U.S. Provisional Patent Application No. 63/409,595, filed Sep. 23, 2022, the contents of which are incorporated herein by reference as if fully disclosed herein.

FIELD

This disclosure relates generally to camera modules. More particularly, this disclosure relates to substrate designs for providing electrical connections to image sensors in camera modules.

BACKGROUND

Cameras are implemented in consumer electronic devices such as smartphones, tablets, and computers. Electronic devices are increasingly becoming smaller and evolving in shape and design. Cameras, however, remain an important feature of the evolving electronic device marketplace.

SUMMARY

Embodiments described herein are directed to devices and systems in which camera modules and flexible printed circuit boards may be connected. In various embodiments, substrate designs of camera modules enable flexible printed circuit boards to be electrically connected to image sensors in camera modules via an external connection on a substrate. In some embodiments, a camera module may comprise a set of housing elements that at least partially defines an interior cavity, a set of lens elements, an image sensor positioned within the interior cavity to receive light through the set of lens elements, and a substrate assembly. The substrate assembly may comprise a set of rigid substrates, a first set of electrical contacts positioned on a first surface of the set of rigid substrates, and a second set of electrical contacts positioned on a second surface of the set of rigid substrates. In some instances, the substrate assembly may be positioned such that a first portion of the substrate assembly is positioned inside the interior cavity and a second portion of the substrate assembly extends outside of the interior cavity. In some instances, the image sensor may be connected to the first set of electrical contacts within the interior cavity. In some instances, the second set of electrical contacts may be positioned outside of the interior cavity.

In some instances, a flexible printed circuit board may be connected to the second portion of the substrate assembly and electrically connected to the second set of electrical contacts that is positioned outside of the interior cavity. In some instances, each electrical contact of the first set of electrical contacts may be electrically connected to a corresponding electrical contact of the second set of electrical contacts. In some instances, the substrate assembly may comprise wiring to provide electrical connectivity from the first set of electrical contacts to the second set of electrical contacts. In some instances, the first surface may face a first direction and the second surface may face the first direction. In some instances, the first surface may face a first direction and the second surface may face a second direction different from the first direction (e.g., an opposite direction). In some instances, the first surface and the second surface may be part of a same rigid substrate of the set of rigid substrates. In some instances, the first surface may be part of a first rigid substrate of the set of rigid substrates. In some instances, the second surface may be part of a second rigid substrate of the set of rigid substrates different from the first rigid substrate. In some instances, the substrate assembly may at least partially define an aperture. In some instances, the image sensor may be positioned to receive light through a set of lens elements and the aperture. In some instances, a stiffener may be positioned distal to the set of lens elements and proximal to the set of rigid substrates with respect to an optical axis of the camera module.

Other embodiments include a camera module comprising a set of housing elements that at least partially defines an interior cavity, a set of lens elements, an image sensor positioned within the interior cavity to receive light through the set of lens elements, a substrate assembly, and an interposer connected to the substrate assembly. The substrate assembly may comprise a set of rigid substrates, a first set of electrical contacts positioned on a first surface of the set of rigid substrates, and a second set of electrical contacts positioned on a second surface of the set of rigid substrates. In some instances, the substrate assembly may be positioned such that a first portion of the substrate assembly is positioned inside the interior cavity and a second portion of the substrate assembly extends outside of the interior cavity. In some instances, the image sensor may be connected to the first set of electrical contacts within the interior cavity. In some instances, the second set of electrical contacts may be positioned outside of the interior cavity.

In some instances, the set of rigid substrates of the substrate assembly may have a stiffness greater than a stiffness of the interposer. In some instances, the interposer may be connected to the first portion of the substrate assembly and may be positioned inside or partially form the interior cavity (e.g., not connected to the second portion of the substrate assembly that extends outside of the interior cavity). In some instances, the first surface may face a first direction and the second surface may face a second direction that is opposite the first direction. In some instances, the second surface may have a plane that is perpendicular to an optical axis of the camera module.

Still other embodiments include a system comprising a camera module, a flexible printed circuit board, and at least one processor. The camera module may comprise a set of housing elements that at least partially defines an interior cavity, a set of lens elements, an image sensor positioned in the interior cavity to receive light through the set of lens elements, and a substrate assembly. The at least one processor may be configured to receive signals from the image sensor. The substrate assembly may comprise a set of rigid substrates, a first set of electrical contacts positioned on a first surface of the set of rigid substrates, and a second set of electrical contacts positioned on a second surface of the set of rigid substrates. In some instances, the substrate assembly may be positioned such that a first portion of the substrate assembly is positioned inside the interior cavity and a second portion of the substrate assembly extends outside of the interior cavity. In some instances, the image sensor may be connected to the first set of electrical contacts within the interior cavity. In some instances, the second set of electrical contacts may be positioned outside of the interior cavity. In some instances, the flexible printed circuit board may be connected to the second portion of the substrate assembly and may be electrically connected to the second set of electrical contacts.

In some instances, the system may include a reinforcement structure that contacts the second portion of the substrate assembly and the flexible printed circuit board. In some instances, the camera module may further comprise an interposer that is positioned between the substrate assembly and at least one of the set of housing elements. In some instances, the substrate assembly may further comprise a third set of electrical contacts positioned on a third surface of the set of rigid substrates. In some instances, the third set of electrical contacts may be positioned outside of the interior cavity. In some instances, the system may include a second flexible printed circuit board that is connected to the second portion of the substrate assembly and may be electrically connected to the third set of electrical contacts.

In addition to the example aspects and embodiments described above and throughout this disclosure, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
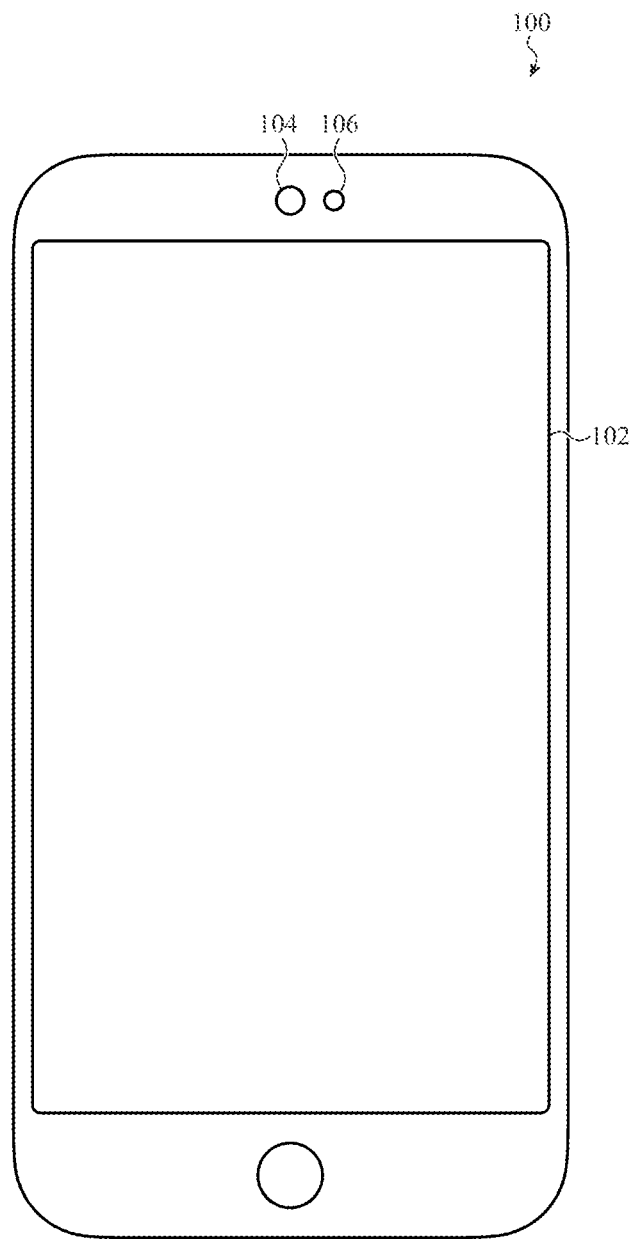
FIGS. 1A and 1B show front and rear views, respectively, of an example of an electronic device having a camera as described herein.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Additionally, the use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to camera modules with substrate assemblies configured to provide exterior electrical connections for routing signals (e.g., a power signal, a control signal, or the like) to and/or from an image sensor, as well as to connect other components (e.g., capacitors, power circuitry, etc.) via the substrate assemblies. In some embodiments, a camera module defines an interior cavity that houses an image sensor, and includes a substrate assembly that is partially positioned outside the interior cavity. The substrate assembly may have one set of electrical contacts that is positioned within the interior cavity and another set of electrical contacts positioned outside of the interior cavity (e.g., on an external surface of the camera module). These sets of electrical contacts are electrically connected to provide a signal pathway from the interior of the camera module to the exterior of the camera module. In some embodiments, the image sensor is connected to the internally-positioned contacts and a flexible printed circuit board is connected to the externally-positioned contacts. Because the flexible printed circuit board may be connected after assembly of the other components of the camera module, the design of the flexible printed circuit board may readily be changed between different units and thereby simplify the manufacturing of the camera modules described herein.

These and other embodiments are discussed herein with reference to FIGS. 1A-10B. However, those skilled in the art will readily appreciate that the detailed description given herein with respect to these Figures is for explanatory purposes only and should not be construed as limiting.

Figure 1B:
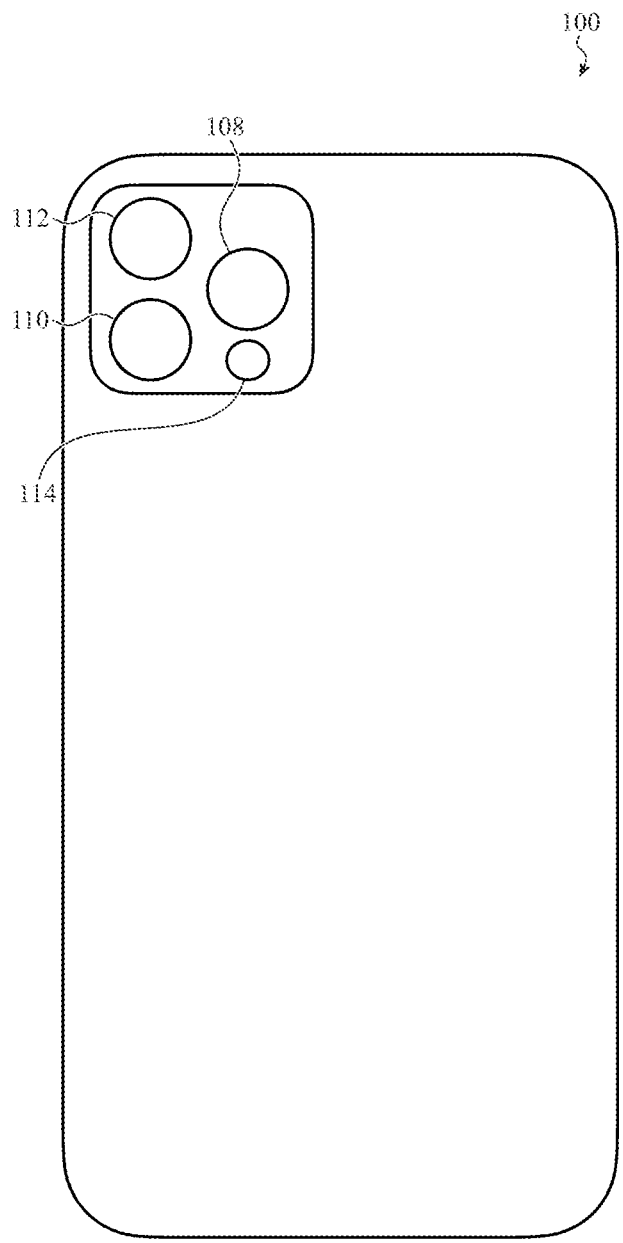
Figure 1C:
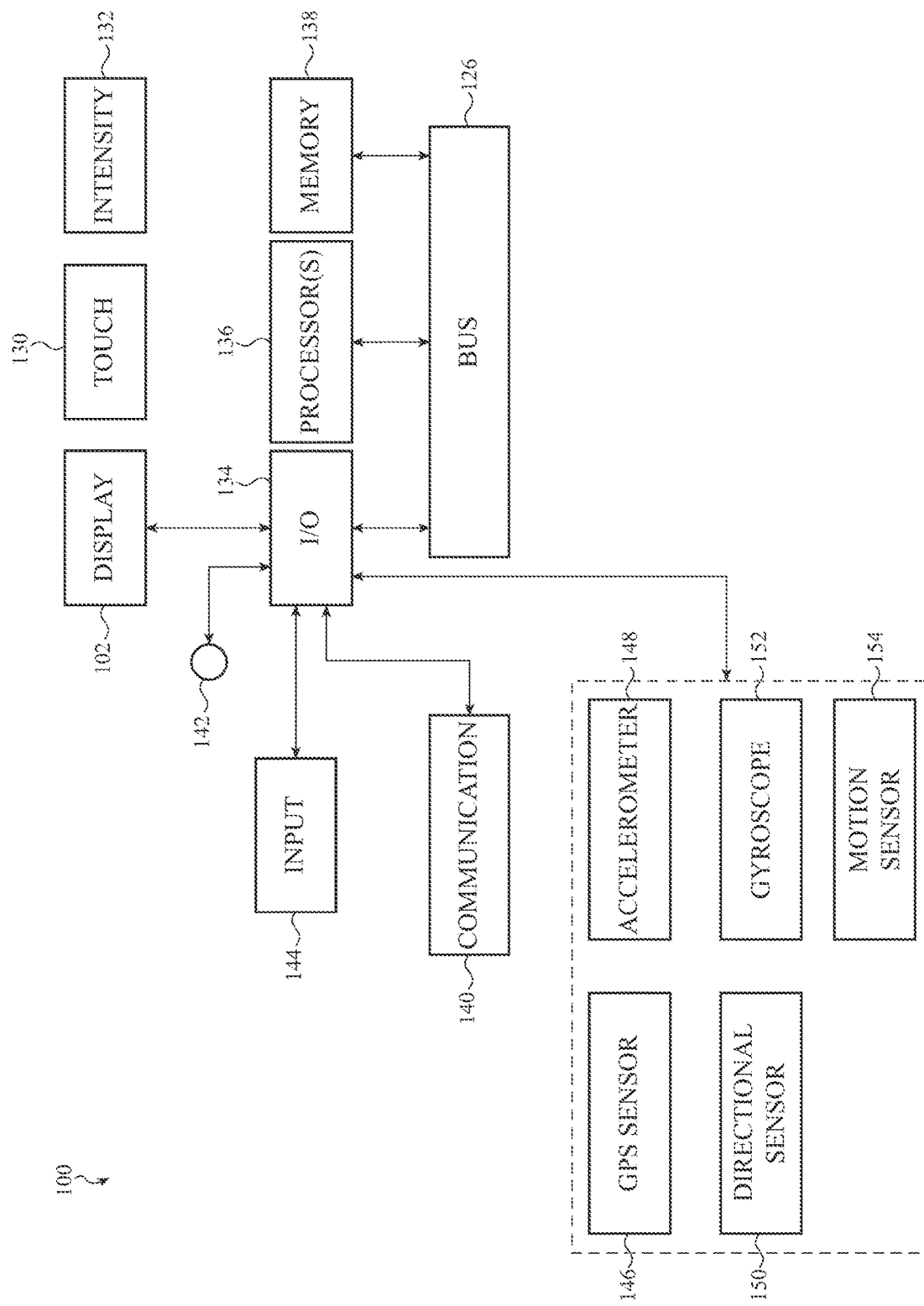
FIG. 1C depicts exemplary components of the device of FIGS. 1A and 1B.

The devices, systems, and techniques described herein may include an electronic device having at least one camera. FIGS. 1A-1C depict an example device 100 as described herein. FIG. 1A shows a front view of the device 100, which includes a display 102 and a front-facing camera 104. The display 102 may provide a graphical output that is viewable through or at a front exterior surface of the device 100. In some instances, the device 100 may further include a front-facing depth sensor 106 that may calculate depth information for a portion of the environment in front of the device 100. Additionally or alternatively, the device 100 may include a front-facing flash module (not shown) configured to provide illumination to a portion of the environment in front of the device 100.

FIG. 1B shows a rear view of the device 100, which includes a set of rear-facing cameras. In the example shown in FIG. 1B, the set of rear-facing cameras includes a first rear-facing camera 108, a second rear-facing camera 110, and a third rear-facing camera 112. The rear-facing cameras may be positioned such that their fields of view at least partially overlap with each other, which may allow the rear-facing cameras to capture different aspects of the environment facing a rear surface of the device 100. Also shown in FIG. 1B is a rear-facing depth sensor 114, which may calculate depth information for a portion of the environment facing the rear surface of the device 100. Additionally or alternatively, the device 100 may include a rear-facing flash module (not shown) configured to provide illumination to a portion of the environment facing the rear surface of the device 100. While the device 100 is shown in FIGS. 1A and 1B as having four cameras and two depth sensors, it should be appreciated that the device 100 may have any number of cameras and depth sensors as desired. The principles described herein may be applied to any camera or cameras of the device 100. For the purpose of illustration, some of the principles of operation described herein may be described with respect to a single camera of a device, which may represent any camera of that device (e.g., a front-facing camera, a rear-facing camera, or the like).

For example, the front-facing camera 104 may include a substrate assembly as described herein. In these instances, the front-facing camera 104 includes a camera module that is connected to a flexible printed circuit board. The flexible printed circuit board may electrically and physically attach the camera module to other components within the device 100. Specifically, the flexible printed circuit board may route signals to and/or from one or more components of the front-facing camera 104.

For example, the front-facing camera 104 includes an image sensor positioned within an interior cavity of the camera module to receive light through a set of lens elements of the camera module. The flexible printed circuit board may carry signals (e.g., a power signal, a control signal, a data signal, or the like) from other components of the device 100 to the image sensor, and/or may carry signals (e.g., signals including image data captured by the image sensor) from the image sensor to other components of the device 100. Additionally or alternatively, the camera module may include one or more actuators to move one or more components within the interior cavity. For example, the camera module may include an actuator configured to move the image sensor and/or one or more lens elements along an optical axis of the camera module to adjust the focus (e.g., using an autofocus operation) or change a zoom level of the camera module. Additionally or alternatively, the camera module may include an actuator configured to translate the image sensor and/or one or more lens elements in a direction perpendicular to the optical axis of the camera module to provide optical image stabilization. In instances where the camera module includes an actuator, the flexible printed circuit board may carry signals between drive circuitry that controls the actuator and the other components of the device 100.

The flexible printed circuit board may be connected to an exterior surface of the camera module, such that the entire flexible printed circuit board is positioned external to the camera module. As described herein, the flexible printed circuit board may be electrically connected to the substrate assembly via electrical contacts that are on an external surface of the camera module. Specifically, the electrical contacts may be positioned on a portion of the substrate assembly that is positioned external to the camera module's interior cavity. Similarly, the image sensor (and/or an actuator in instances where the camera module includes an actuator) may be electrically connected to the substrate assembly via electrical contacts that are positioned with the interior cavity of the camera. These electrical contacts are located on a portion of the substrate assembly that is positioned inside the interior cavity of the camera module. Wiring or traces portions of the substrate assembly may electrically contact the interior and exterior electrical contacts. Accordingly, signals may be routed between the image sensor (and/or an actuator) and the flex circuit through the substrate assembly. For example, image signals from the image sensor may be routed (e.g., through the substrate assembly and the flex circuit) to image processing circuitry, such as an image signal processor, and processed such that a video or image is presented on the display 102.

In some embodiments, the device 100 is a portable multifunction electronic device, such as a mobile telephone, that also contains other functions, such as PDA and/or music player functions, and associated components arranged therein. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., display 102). In some embodiments, the display generation component is separate from the computer system.

FIG. 1C depicts exemplary components of device 100. In some embodiments, device 100 has a bus 126 that operatively couples I/O section 134 with one or more computer processors 136 and memory 138. I/O section 134 can be connected to display 102, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of device 100 can include one or more non-transitory computer-readable storage mediums, for storing computer-executable instructions, which, when executed by one or more processors 136, for example, can cause the processors to perform the techniques associated with the device 100. For example, the one or more processors 136 may be configured to receive signals routed from the image sensor corresponding to any of the four cameras of device 100. A computer-readable storage medium can be any medium that can tangibly contain or store computer-executable instructions for use by or in connection with the instruction execution system, apparatus, or device. In some instances, the storage medium is a transitory computer-readable storage medium. In some instances, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The one or more processors 136 can include, for example, dedicated hardware, a computing device, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate operating a camera and capturing of images. Device 100 is not limited to the components and configuration of FIG. 1C, but can include other or additional components in multiple configurations.

Figure 2A:
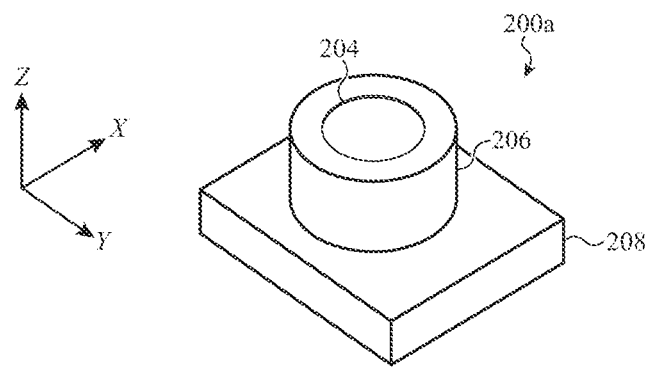
FIG. 2A shows a perspective view of an example camera module that is configured to internally connect with a flexible printed circuit board.

Any of the four cameras of device 100 discussed with respect to FIGS. 1A-1C may include corresponding camera modules and flexible printed circuit boards as described herein. Providing an exterior connection between a camera module and a flexible printed circuit board may provide additional flexibility for incorporating a particular camera module design into a range of different electronic devices. FIG. 2A shows a camera module 200a that is configured to provide an internal connection to a flexible printed circuit board. The camera module 200a may include a lens array 204, an upper housing element 206, and a lower housing element 208. The lens array 204 includes a set of lens elements that may collectively be configured to direct light received by the camera module 200a toward an image sensor (not shown in FIG. 2A). Some or all of the lens elements of the lens array 204 may be housed by the upper housing element 206. In some instances the lens elements of the lens array 204 are fixed relative to the upper housing element 206 (or another housing element of the camera module 200a), and may be adhered, sealed, or friction fit to the upper housing element 206. The upper housing element 206 may be a housing element of a set of housing elements that at least partially defines an interior cavity of the camera module 200a. The lower housing element 208 may also be a housing element of a set of housing elements that at least partially defines the interior cavity of the camera module 200a. In FIG. 2A, the camera module 200a is shown in isolation without any inclusion of or any connection with a flexible printed circuit board.

Figure 2B:
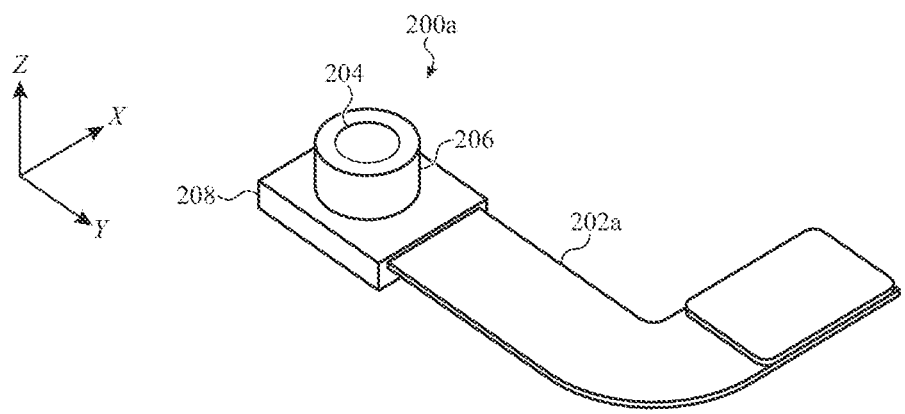
FIGS. 2B and 2C show perspective views of example camera modules having internally-connected flexible printed circuit boards.

FIG. 2B shows the camera module 200a with an internally-connected flexible printed circuit board 202a. One end of the flexible printed circuit board 202a extends into the interior cavity at least partially defined by the upper and lower housing elements 206, 208. This end of the flexible printed circuit board 202a is electrically connected to electrical contacts positioned on a surface inside the interior cavity of the camera module 200a. The flexible printed circuit board 202a exits the camera module 200a (e.g., via an opening in the side of the camera module 200a) so that one or more other ends of the flexible printed circuit board 202a may be connected to components, for example, in a device (e.g., device 100) that incorporates the camera module 200a.

Figure 2C:
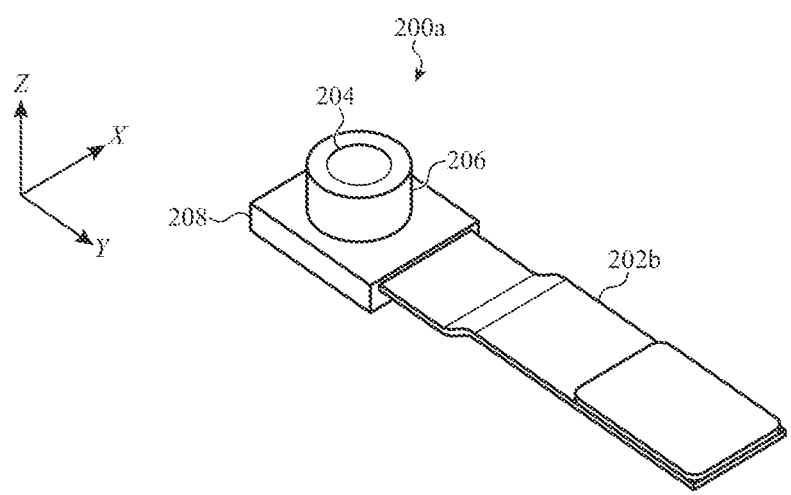

In the variations shown in FIG. 2B, the flexible printed circuit board 202a has an L-shaped section. This may allow the flexible printed circuit board to route signals from the camera module 200a to another component, and avoid various intervening components. While an L-shaped section may make sense for some devices, it may not work with the layout of a different device. For example, other layouts of a device that incorporate the camera module 200a may require a different configuration of the flexible printed circuit board 202a. For example, FIG. 2C shows the camera module 200a with an internally-connected flexible printed circuit board 202b that is a straight section with a vertical offset.

Figure 2D:
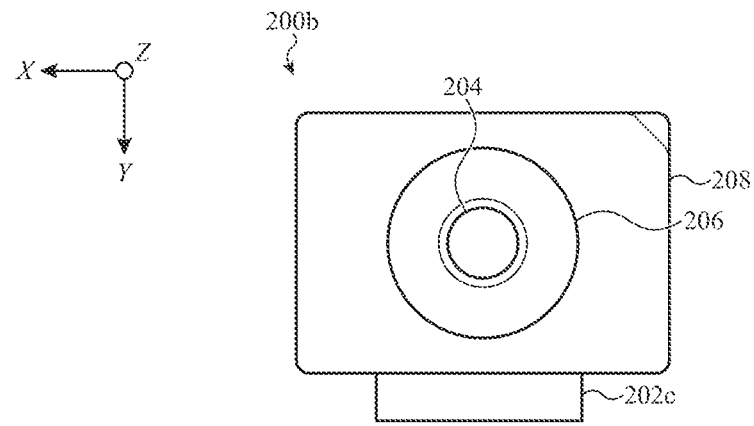
FIGS. 2D and 2E show top and cross-sectional side views, respectively, of an example camera module having an internally-connected flexible printed circuit board.
Figure 2E:
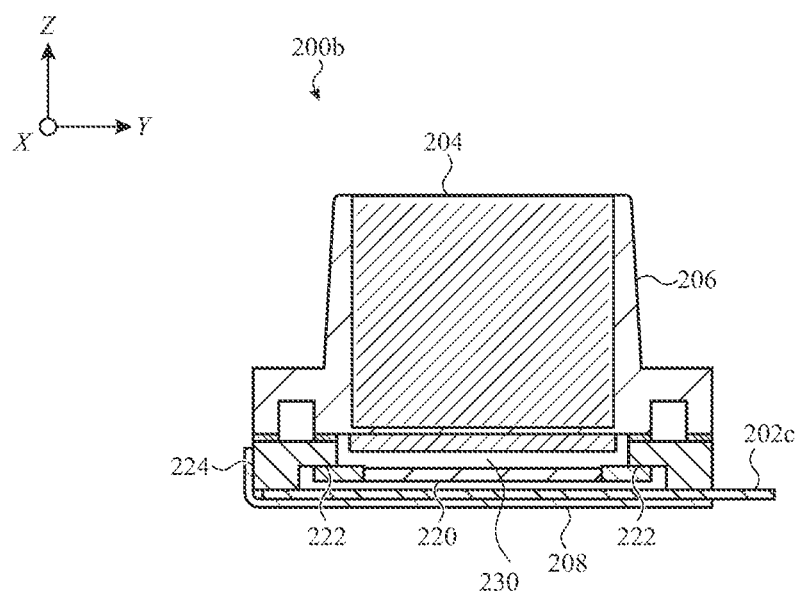

FIGS. 2D and 2E show a camera module 200b that illustrates how an internally-connected flexible printed circuit board 202c may be connected within an interior cavity of the camera module 200b. The camera module 200b may be configured as described with respect to FIG. 2A, and may include a lens array 204, an upper housing element 206, and a lower housing element 208. An internally-connected flexible printed circuit board 202c extends from the camera module 200b along the Y-axis of a cartesian coordinate system shown in conjunction with camera module 200b. In the cross-sectional side view of FIG. 2E, an image sensor 220 is positioned within an interior cavity 230 of the camera module 200b to receive light that has passed through the lens array 204. Electrical contacts 222 are positioned internally on one or more rigid substrates 224 within camera module 200b. The image sensor 220 may be physically and electrically connected to substrate 224 via the electrical contacts 222. The one or more substrates 224 may define one or more exterior portions of the camera module 200b and may at least partially define the interior cavity 230 of the camera module 200b. Wiring or traces (not shown in FIG. 2E) disposed on one or more substrates 224 electrically connect the electrical contacts 222 to additional contact points on surfaces of the one or more substrates 224 inside the interior cavity. The additional contact points on the surfaces of the one or more substrates 224 may be a plurality of anisotropic conductive film (ACF) pads that align and contact with corresponding ACF pads of the flexible printed circuit board 202c. The lower housing element 208 may act as a stiffener and may be connected to portions of the one or more substrates 224 and the flexible printed circuit board 202c to secure the ACF pads of the flexible printed circuit board 202c to the ACF pads of the one or more substrates 224.

Benefits can be realized by constructing device components that include the camera module 200a or camera module 200b with an integrated and internally-connected flexible printed circuit board, such as a relatively strong mechanical connection between the flexible printed circuit board and the camera module. This approach, however, may require the flexible printed circuit board to be attached during assembly of the camera module, and thus the flexible printed circuit board needs to be selected prior to assembly of the camera module. This may limit the range of devices into which the camera module may be incorporated. For example, it may be useful to utilize a single camera module design across a range of different products. These different products may have different space constraints, and thus may require different configurations of flexible printed circuit boards (e.g., a first product line may require the use the L-shaped flexible printed circuit board 202a of FIG. 2B while a second product line may require the use of the straight flexible printed circuit board 202b of FIG. 2C). Once a camera module with a particular integrated flexible printed circuit board has been assembled, it may no longer be suitable for integration into other product lines.

Conversely, the camera modules described herein include a substrate assembly architecture that allows for the electrical interconnection between the image sensor and a flexible printed circuit board to be positioned on an exterior surface camera module. This allows the flexible printed circuit board to be connected to the camera module after the camera module is fully assembled, and thus the camera module may subsequently be connected to any flexible printed circuit board design as may be desired without requiring a change to the assembly steps used to assemble the camera module. In this manner, greater operational and supply chain flexibility may be realized to support different products or product lines that may use the same camera module with different flexible printed circuit board designs. In other instances, a camera module may be manufactured before a design of a flex circuit is set, which may provide flexibility in the design process.

Figure 3A:
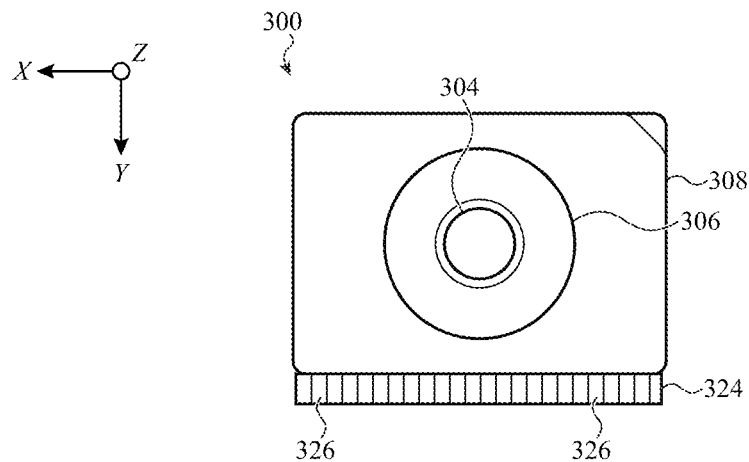
FIGS. 3A and 3B show top and cross-sectional side views, respectively, of an example camera module as described herein that includes an externally-connected flexible printed circuit board.
Figure 3B:
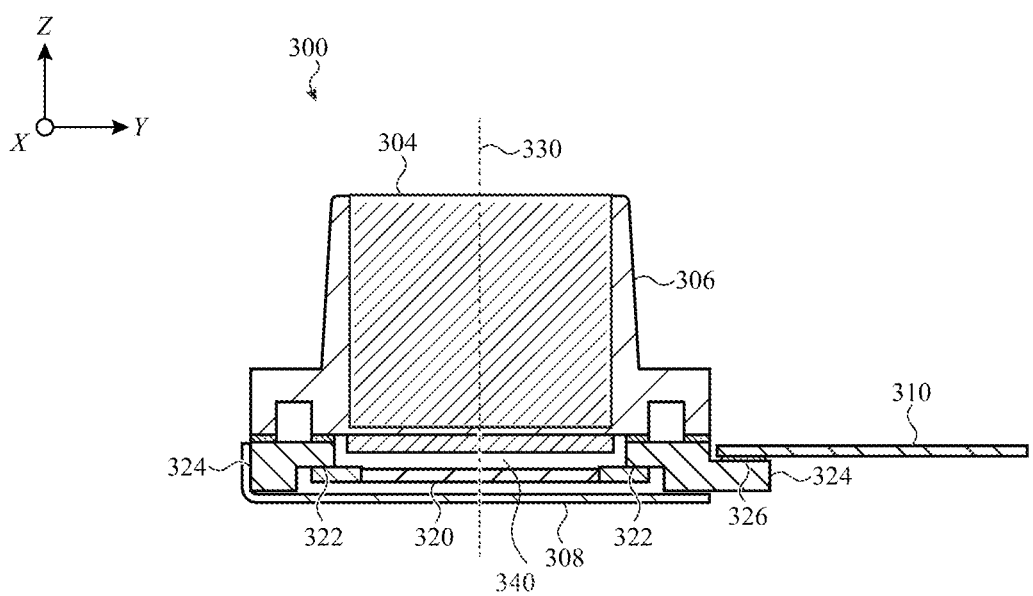

For example, FIGS. 3A and 3B show a camera module 300 having electrical contacts positioned on a substrate assembly external to an interior cavity 340 of the camera module 300. Camera module 300 may include lens array 304, an upper housing element 306, and a lower housing element 308. The lens array 304 may include a set of lens elements that are collectively configured to direct light received by the camera module 300 toward image sensor 320, and may be configured in any manner as described with respect to the lens array 204 of FIGS. 2A-2E. The upper housing element 306 may be a housing element of a set of housing elements that at least partially defines the interior cavity 340 of the camera module 300. The lower housing element 308 may also be a housing element of a set of housing elements that at least partially defines the interior cavity of the camera module 300. These housing elements may also define one or more exterior surfaces of the camera module 300. Additionally or alternatively, one or more rigid substrates 324 of a set of rigid substrates, which likewise may at least partially define the interior cavity 340 of the camera module 300 and/or may define one or more exterior surfaces of the camera module as described herein. In some variations, each rigid substrate of the set of rigid substrates may be formed from one or more ceramic materials.

In the cross-sectional side view of FIG. 3B, the image sensor 320 is positioned within the interior cavity 340 of the camera module 300 to receive light that has passed through lens array 304. The camera module 300 may have an optical axis 330 defined with respect to the set of lens elements of camera module 300 along the Z-axis of a cartesian coordinate system shown in conjunction with camera module 300. Electrical contacts 322 are electrically connected to the image sensor 320. These electrical contacts 322 are positioned internally on one or more internal surfaces of portions of the one or more substrates 324 within camera module 300. For example, the electrical contacts 322 may be positioned on a first surface of a portion of the one or more substrates 324. That is, portions of the one or more substrates 324 may constitute part of the lower housing element 308 and may at least partially define the interior cavity 340 of the camera module 300. Additionally, as shown in the example of FIG. 3B, portions of the one or more substrates 324 also constitute part of an exterior surface of the camera module 300 (e.g., to define an exterior ledge of the camera module 300). That is, portions of the one or more substrates 324 may extend a distance perpendicular to the optical axis 330 greater than a distance perpendicular to the optical axis 330 for which portions of the upper housing element 306 and lower housing element 308 extend. Other variations, for example, in which portions of an upper housing element and/or lower housing element may extend a same or even greater distance perpendicular to the optical axis 330 than an end of the one or more substrates (e.g., a substrate notch or recess design to receive a flexible printed circuit board) are contemplated.

Wiring or traces (not shown in FIG. 3B) disposed on one or more substrates 324 electrically connect the interior electrical contacts 322 to exterior electrical contacts 326. This allows signals to be carried from the image sensor 320 to one or more surfaces of a portion of the one or more substrates 324 that extends outside of the interior cavity 340 of the camera module 300. The exterior electrical contacts 326 of camera module 300 positioned on the one or more substrates 324 may be ACF pads. It should be appreciated, however, that the electrical contacts discussed herein may include any suitable type or combination of types of electrical contacts. In addition to or as an alternative to ACF pads, electrical contacts may include hot-bar pads, board-to-board (BTB) connectors, combinations thereof, or the like. For example, the exterior electrical contacts 326 may be positioned on a second surface of a portion of the one or more substrates 324. The exterior electrical contacts 326 are configured to receive and connect with corresponding electrical contacts of an externally-connected flexible printed circuit board 310. That is, an entirety of the flexible printed circuit board 310 may be positioned externally to the camera module (e.g., positioned outside of the interior cavity 340) of the camera module 300. In some instances, the first surface on which the electrical contacts 322 are positioned on a portion of the one or more substrates 324 may face a first direction. In some instances, the second surface on which the exterior electrical contacts 326 are positioned on a portion of the one or more substrates 324 may face a second direction that is opposite the first direction. In some instances, the second surface on which the exterior electrical contacts 326 are positioned on the portion of the one or more substrates 324 may have a plane that is perpendicular to the optical axis 330 of the camera module 300. The lower housing element 308 may be configured as a stiffener that is connected to at least some portions of the one or more substrates 324. In some instances, the lower housing element 308 may be a metallic stiffener configured or arranged to provide mechanical support and/or protection to components (e.g., the set of lens elements and the image sensor 320) disposed within the camera module 300. In some instances, the stiffener may be positioned distal to the set of lens elements and proximal to the one or more substrates 324 with respect to the optical axis 330 of the camera module 300.

Figure 4A:
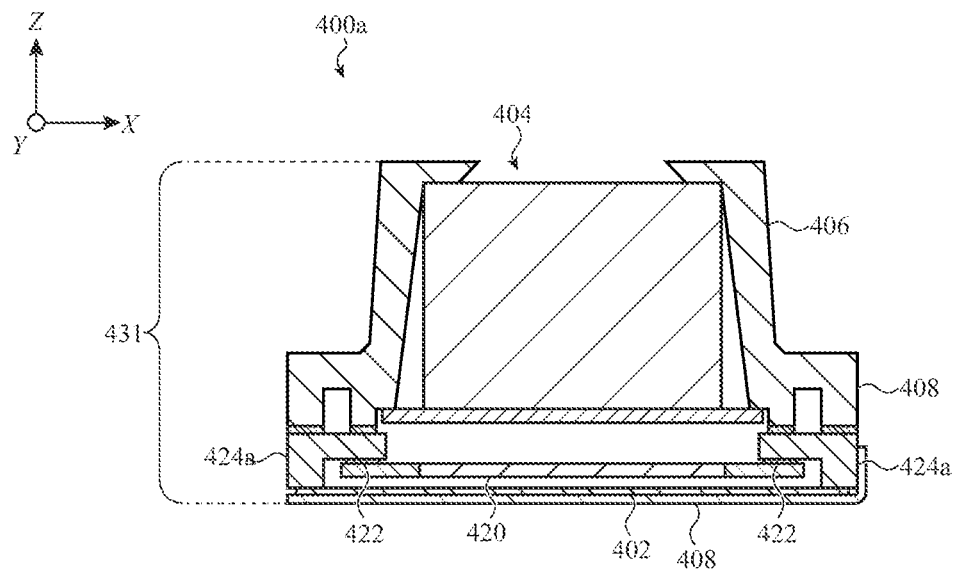
FIGS. 4A and 4B show cross-sectional side views of two example camera modules as described herein.
Figure 4B:
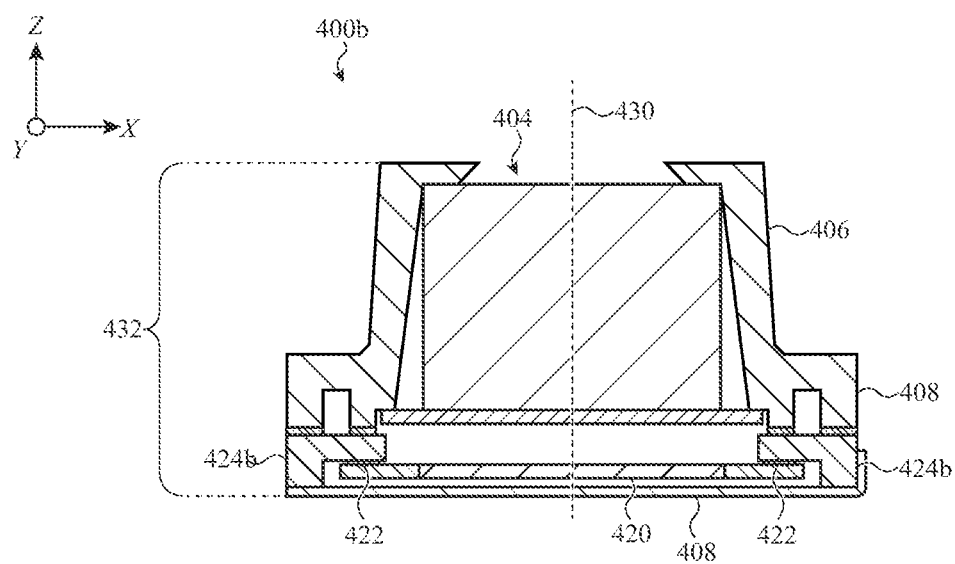

Camera modules having an externally-connected flexible printed circuit board may be configured with a shorter height when compared to camera modules with internally-connected flexible printed circuit boards. FIGS. 4A and 4B show cross-sectional side views of two camera module examples, camera module 400a and camera module 400b, respectively. Camera module 400a is an example similar to the examples of camera module 200a and 200b. Camera module 400a may include a lens array 404, an upper housing element 406, a lower housing element 408, and an internally-connected flexible printed circuit board 402 that extends out of the lower housing element 408 in the Y-axis of a cartesian coordinate system shown in conjunction with camera module 400a. An image sensor 420 is positioned within an interior cavity of the camera module 400a to receive light that has passed through the lens array 404. Electrical contacts 422 are positioned internally on one or more substrates 424a of a set of rigid substrates within camera module 400a and are electrically connected to the image sensor 420. In these instances, the camera module 400a needs to have sufficient height to fit the flexible printed circuit board 402 between the lower housing element 408 and the substrate assembly.

Camera module 400b is an example similar to the example of camera module 300. Camera module 400b may include a lens array 404, an upper housing element 406, and a lower housing element 408, which may be configured as described herein. The camera module 400b has an optical axis 430 defined with respect to the lens array 404 of the camera module 400b along the Z-axis of a cartesian coordinate system shown in conjunction with camera module 400b. The upper housing element 406 may be a housing element of a set of housing elements that at least partially defines an interior cavity of the camera module 400b. The lower housing element 408 may also be a housing element of a set of housing elements that at least partially defines the interior cavity of the camera module 400b. Additionally or alternatively, the lower housing element 408 may be a formed in whole or in part from one or more substrates 424b of a set of rigid substrates, which likewise may at least partially define the interior cavity of the camera module 400b.

The image sensor 420 is positioned within the interior cavity of the camera module 400b to receive light that has passed through the set of lens elements. In some instances, the image sensor 420 may be connected or supported by the set of rigid substrates. Electrical contacts 422 are electrically connected to the image sensor 420. These electrical contacts 422 are positioned internally on one or more internal surfaces of portions of the one or more substrates 424b within camera module 400b. That is, portions of the one or more rigid substrates 424b may constitute part of the lower housing element 408 and may at least partially define the interior cavity of the camera module 400b. Wiring or traces (not shown in FIG. 4B) disposed on one or more substrates 424b electrically connect the electrical contacts 422 to exterior electrical contacts (not shown in FIG. 4B) on one or more surfaces of a portion of the one or more rigid substrates 424b that extends outside of the interior cavity of the camera module 400b. One or more electrical layers may be formed in the one or more rigid substrates 424b for the wiring or traces to route various power and signals for the operation of the image sensor 420 by electrically interconnected components of a device. The ledge portion of the one or more substrates 424b and the exterior electrical contacts are not shown in the cross-sectional side view of FIG. 4B of camera module 400b as the ledge portion extends along the Y-axis (e.g., out of the page) in this figure orientation.

As camera module 400b does not include an internally-connected flexible printed circuit board, a height 432 along the Z-axis of the cartesian coordinate system (e.g., the Z-stack dimension) for camera module 400b is less than a height 431 in the Z-axis for camera module 400a. That is, the flexible printed circuit board exists outside of the critical thickness (e.g., the Z-axis or Z-stack dimension) associated with camera module designs, allowing for additional space to be budgeted for other internal components (e.g., an extended optical stack). Additionally or alternatively, the lower housing element 408 or other housing elements may be thickened to provide further structural integrity of the camera module 400b without increasing the overall thickness. Additionally or alternatively, the reduction in the critical thickness (e.g., the Z-axis or Z-stack dimension) associated with camera module designs may be realized in the overall device.

Beneficially, variations of camera module 400b allow for improved camera modules with a similar or reduced thickness to camera modules designed in accordance with the example of camera module 400a. Moreover, by moving the ACF pads and end portions of the flexible printed circuit board from an internal position of the camera module to an external position of the camera module, the flexible printed circuit board can become an add-on component rather than an integral component of the camera module, thereby decoupling the manufacture and design of the camera module from the design of the flexible printed circuit board as described herein.

Figure 5A:
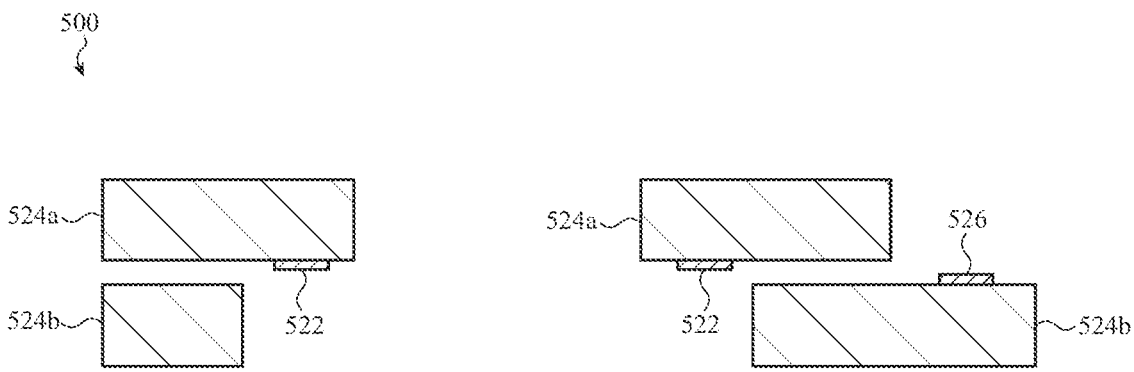
FIG. 5A shows a cross-sectional side view of an example substrate assembly prior to connecting substrates as described herein.

In many instances, the substrate assemblies described herein include two or more rigid substrates. For example, FIG. 5A shows an example of a substrate assembly 500 that may be used in the camera modules described herein, such as the camera module 300 or camera module 400b described with respect to FIGS. 3A, 3B and 4B, respectively. The substrate assembly 500 includes a set of rigid substrates, which may include an upper substrate 524a and a lower substrate 524b. It is to be understood that in the cross-sectional side view of FIG. 5A, the left portion of the upper substrate 524a and the right portion of the upper substrate 524a may constitute a single unitary substrate piece (e.g., a rectangular box shape with a hollowed out center portion) or multiple substrates that are formed into a single unitary substrate piece. That is, the space between the left portion and the right portion of the upper substrate 524a in FIG. 5A represents an aperture of the upper substrate 524a if viewed from a top or bottom (e.g., Z-axis) perspective. Similarly, the left portion of the lower substrate 524b and right portion of the lower substrate 524b may constitute a single unitary substrate piece (e.g., a rectangular box shape with a hollowed out center portion of a different size than that of the upper substrate 524a) or multiple substrates that are formed into a single unitary substrate piece. That is, the space between the left portion and the right portion of the lower substrate 524b in FIG. 5A represents an aperture of the lower substrate 524b if viewed from a top or bottom (e.g., Z-axis) perspective. These apertures may allow for an image sensor to be attached to the substrate assembly (e.g., positioned within the aperture defined through the lower substrate 524b) and receive light that passes through the substrate assembly (e.g., through the aperture defined through the upper substrate 524a).

The substrate assembly 500 includes electrical contacts 522, which are positioned on a lower surface of a portion of the upper substrate 524a. When the substrate assembly 500 is incorporated into a camera module as described herein, this portion of the upper substrate 524a is positioned in an interior cavity defined within the camera module (and thereby defines an interior portion of the substrate assembly 500). The substrate assembly 500 also includes exterior electrical contacts 526, which are positioned on an upper surface of a portion of the lower substrate 524b. When the substrate assembly 500 is incorporated into the camera module, this portion of the lower substrate 524b extends outside of the interior cavity defined within the camera module (and thereby defines an exterior portion of the substrate assembly 500). At least a portion of this exterior portion of the substrate assembly 500 may define one or more exterior surfaces of the camera module.

Figure 5B:
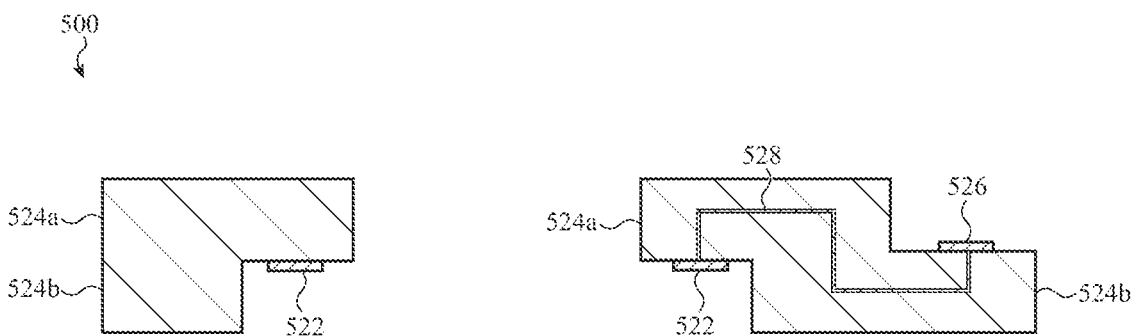
FIG. 5B shows a cross-sectional side view of the example substrate assembly after including wiring and connecting substrates as described herein.

A flexible printed circuit board (not shown) may be connected to the upper surface of the exterior portion of the substrate assembly 500 and electrically connected to the exterior electrical contacts 526. Similarly, an image sensor and/or an actuator may be electrically connected to the interior electrical contacts 522. As shown in FIG. 5B, upper substrate 524a and lower substrate 524b may be connected or formed to at least partially define the overall shape of the substrate assembly 500. Wiring 528 (e.g., electrical traces) electrically connects the interior electrical contacts 522 and the exterior electrical contacts 526 and may be used to carry signals therebetween (and thereby carry signals between the externally-connected flexible printed circuit board and the image sensor and/or actuator). The wiring 528 may be routed in any suitable manner between and/or within the upper substrate 524a and lower substrate 524b to facilitate the electrical connection between the interior electrical contacts 522 and the exterior electrical contacts 526. The upper substrate 524a and the lower substrate 524b may be connected in any suitable manner. For example, in some variations the upper substrate 524a and the lower substrate 524b may be laminated, which may additionally encapsulate and electrically isolate the individual wires or traces in the wiring 528.

The interior electrical contacts 522 as shown in FIGS. 5A and 5B are positioned on a rear-facing side (i.e., a side that faces away from an imaging surface of the image sensor) of the upper substrate 524a, and the exterior electrical contacts 526 are positioned on a front-facing side (i.e., facing the same direction as the imaging surface of the image sensor) of the lower substrate 524b. In these variations, the interior electrical contacts 522 and the exterior electrical contacts 526 face in opposite directions. It should be appreciated, however, that the interior and exterior electrical contacts may have any suitable relative orientation. For example, the interior electrical contacts 522 may alternatively be positioned on a front-facing side of the upper substrate 524a. Additionally or alternatively, the exterior electrical contacts 526 may be positioned on a rear-facing side of the lower substrate 524b. In still other variations, the substrate assembly 500 may be configured such that the interior electrical contacts 522 are positioned on a portion (e.g., a front facing surface and/or a rear facing surface) of the lower substrate 524b and the exterior electrical contacts 526 are positioned on a portion (e.g., a front facing surface and/or a rear facing surface) of the upper substrate 524a.

Figure 6A:
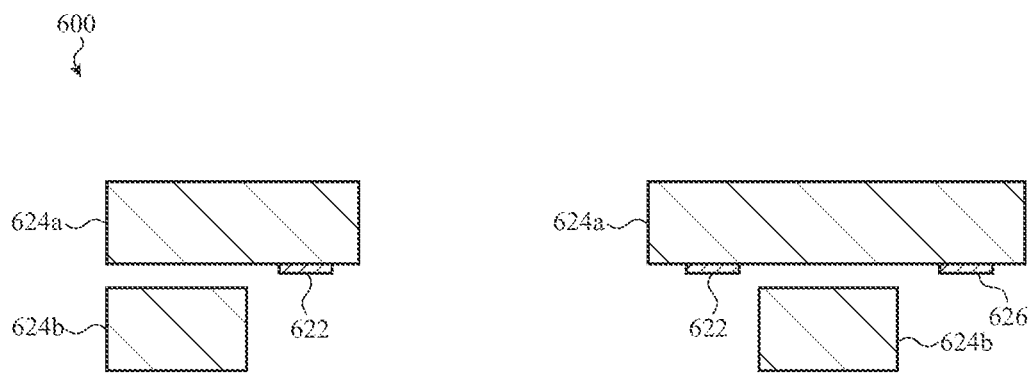
FIG. 6A shows a cross-sectional side view of another example substrate assembly prior to connecting substrates as described herein.

Additionally, while the interior and exterior contacts 522, 526 are shown in FIGS. 5A and 5B as being positioned on different substrates of the substrate assembly 500, in some variations interior and exterior electrical contacts may be positioned on different portions of the same substrate. FIG. 6A shows an example of a substrate assembly 600 that may be used in the camera modules described herein, such as the camera module 300 or camera module 400b described with respect to FIGS. 3A, 3B and 4B, respectively. The substrate assembly 600 includes a set of rigid substrates, which may include an upper substrate 624a and a lower substrate 624b. It is to be understood that in the cross-sectional side view of FIG. 6A, the left portion of the upper substrate 624a and the right portion of the upper substrate 624a may constitute a single unitary substrate piece (e.g., a rectangular box shape with a hollowed out center portion) or multiple substrates that are formed into a single unitary substrate piece. That is, the space between the left portion and the right portion of the upper substrate 624a in FIG. 6A represents an aperture of the upper substrate 624a if viewed from a top or bottom (e.g., Z-axis) perspective. Similarly, the left portion of the lower substrate 624b and right portion of the lower substrate 624b may constitute a single unitary substrate piece (e.g., a rectangular box shape with a hollowed out center portion of a different size than that of the upper substrate 624a) or multiple substrates that are formed into a single unitary substrate piece. That is, the space between the left portion and the right portion of the lower substrate 624b in FIG. 6A represents an aperture of the lower substrate 624b if viewed from a top or bottom (e.g., Z-axis) perspective. These apertures may allow for an image sensor to be attached to the substrate assembly (e.g., positioned within the aperture defined through the lower substrate 624b) and receive light that passes through the substrate assembly (e.g., through the aperture defined through the upper substrate 624a).

The substrate assembly 600 includes electrical contacts 622, which are positioned on a lower surface of a first portion of the upper substrate 624a. When the substrate assembly 600 is incorporated into a camera module as described herein, the first portion of the upper substrate 624a is positioned in an interior cavity defined within the camera module (and thereby defines an interior portion of the substrate assembly 600). The substrate assembly 600 also includes exterior electrical contacts 626, which are positioned on a lower surface of a second portion of the upper substrate 624a. When the substrate assembly 600 is incorporated into the camera module, the second portion of the upper substrate 624a extends outside of the interior cavity defined within the camera module (and thereby defines an exterior portion of the substrate assembly 600). At least a portion of this exterior portion of the substrate assembly 600 may define one or more exterior surfaces of the camera module.

Figure 6B:
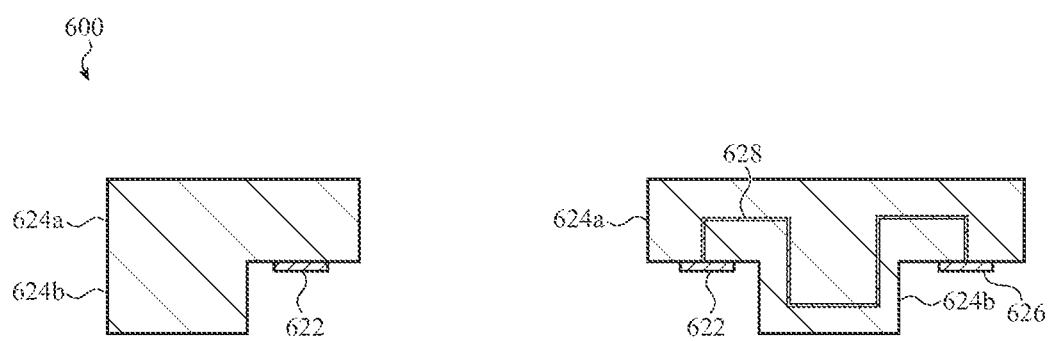
FIG. 6B shows a cross-sectional side view of the example substrate assembly after including wiring and connecting substrates as described herein.

A flexible printed circuit board may be connected to the lower surface of the exterior portion of the substrate assembly 600 and electrically connected to the exterior electrical contacts 626. Similarly, an image sensor and/or an actuator may be electrically connected to the interior electrical contacts 622. As shown in FIG. 6B, upper substrate 624a and lower substrate 624b may be connected or formed to at least partially define the overall shape of the substrate assembly 600. Wiring 628 (e.g., electrical traces) electrically connects the interior electrical contacts 622 and the exterior electrical contacts 626 and may be used to carry signals therebetween (and thereby carry signals between the externally-connected flexible printed circuit board and the image sensor and/or actuator). The wiring 628 may be routed in any suitable manner between and/or within the upper substrate 624a and/or lower substrate 624b to facilitate the electrical connection between the interior electrical contacts 622 and the exterior electrical contacts 626. The upper substrate 624a and the lower substrate 624b may be connected in any suitable manner. For example, in some variations the upper substrate 624a and the lower substrate 624b may be laminated, which may additionally encapsulate and electrically isolate the individual wires or traces in the wiring 628. Both the interior electrical contacts 622 and the exterior electrical contacts 626 are shown in FIGS. 6A and 6B as both being positioned on a rear-facing side of the upper substrate 624a, though it should be appreciated that one or both of the interior and exterior electrical contacts may be positioned on a front-facing side of the upper substrate 624a.

In some instances, the lower substrate 624b may be replaced with an interposer component. The interposer may act as a structural component to help position the upper substrate 624a within a camera module, but does not include wiring to facilitate electrical connections between the interior and exterior electrical contacts. Because the interposer does not include wiring, it may have more relaxed stiffness requirements as compared to the lower substrate 624b, and thus may be made from a wider range of materials.

Figure 7A:
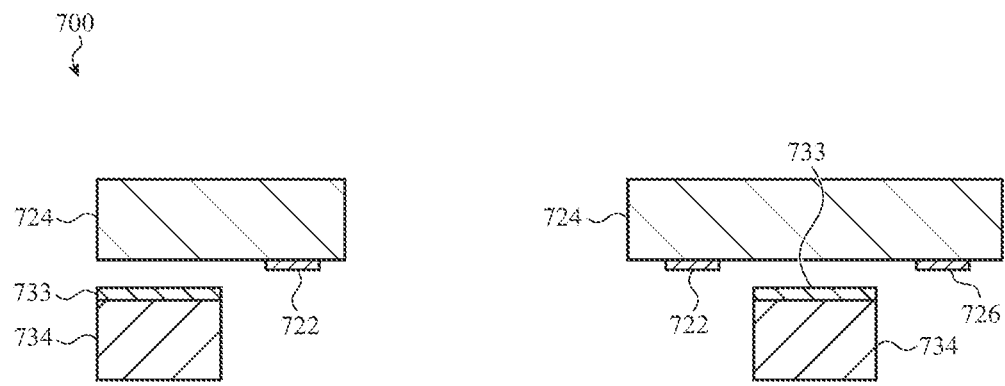
FIG. 7A shows a cross-sectional side view of an example substrate assembly and interposer prior to connecting the substrate and interposer as described herein.

FIG. 7A shows an example of substrate assembly 700 with an interposer component. The substrate assembly 700 with the interposer component may be used for camera modules such as or similar in design to camera module 300 or camera module 400b. The substrate assembly 700 includes a set of rigid substrates, which may be a single substrate block. For example, the substrate assembly 700 includes a substrate 724. It is to be understood that in the cross-sectional side view of FIG. 7A, the left portion of the substrate 724 and the right portion of the substrate 724 may constitute a single unitary substrate piece (e.g., a rectangular box shape with a hollowed out center portion) or multiple substrates that are formed into a single unitary substrate piece. That is, the space between the left portion and the right portion of the substrate 724 in FIG. 7A represents an aperture of the substrate 724 if viewed from a top or bottom (e.g., Z-axis) perspective. When an image sensor is positioned behind the substrate 724, it may receive light that has passed through this aperture.

Also shown in FIG. 7A is an interposer 734. The left portion of the interposer 734 and right portion of the interposer 734 may constitute a single unitary piece (e.g., a rectangular box shape with a hollowed out center portion of a different size than that of the substrate 724) or multiple interposer pieces that are formed into a single unitary piece. That is, the space between the left portion and the right portion of the interposer 734 in FIG. 7A represents an aperture of the interposer 734 if viewed from a top or bottom (e.g., Z-axis) perspective. An image sensor may be positioned within the aperture of the interposer 734 to connect the image sensor to the substrate 724.

The interposer 734 may be formed from a different material or materials than the material or materials used to form the substrate 724. In some variations, the substrate 724 has a stiffness greater than a stiffness of the interposer 734. That is, in some variations, a specific modulus value of the substrate 724 is greater than a specific modulus value of the interposer 734. In these instances, the interposer 734 may act as an absorber or dampener to protect the image sensor and other components of a camera module. For example, characteristics of the interposer 734 may aid in protecting the image sensor from vibrations, shock, or other mechanically challenging events, such as but not limited to, high thermal stress that may exist under operation of the image sensor in a device. The interposer 734 may be comprised of plastic, silicon, or other suitable material. Additionally or alternatively, the interposer 734 may include a thermally-conductive material that is capable of acting as a thermal sink during operation of the image sensor.

The substrate assembly 700 includes electrical contacts 722, which are positioned on a lower surface of a first portion of the substrate 724. When the substrate assembly 700 is incorporated into a camera module as described herein, the first portion of the substrate 724 is positioned in an interior cavity defined within the camera module (and thereby defines an interior portion of the substrate assembly 700). The substrate assembly 700 also includes exterior electrical contacts 726, which are positioned on a lower surface of a second portion of the substrate 724. When the substrate assembly 700 is incorporated into the camera module, the second portion of the substrate 724 extends outside of the interior cavity defined within the camera module (and thereby defines an exterior portion of the substrate assembly 700). At least a portion of this exterior portion of the substrate assembly 700 may define one or more exterior surfaces of the camera module.

Figure 7B:
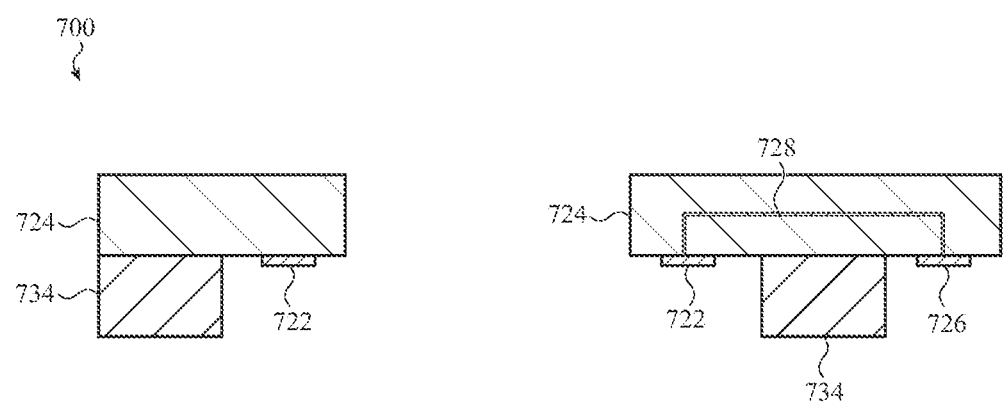
FIG. 7B shows a cross-sectional side view of the example substrate and interposer assembly after including wiring and connecting the substrate and interposer as described herein.

A flexible printed circuit board may be connected to the lower surface of the exterior portion of the substrate assembly 700 and electrically connected to the exterior electrical contacts 726. Similarly, an image sensor and/or an actuator may be electrically connected to the interior electrical contacts 722. Wiring 728 (e.g., electrical traces) electrically connects the interior electrical contacts 722 and the exterior electrical contacts 726 and may be used to carry signals therebetween (and thereby carry signals between the externally-connected flexible printed circuit board and the image sensor and/or actuator). The wiring 728 may be routed in any suitable manner on or within the substrate 724. As shown in FIGS. 7A and 7B, the substrate 724 and the interposer 734 may be connected with an adhesive 733. For example, a portion of the wiring (not shown) used to electrically connect the interior electrical contacts 722 and the exterior electrical contacts 726 may be positioned (or sandwiched) between the substrate 724 and the interposer 734. In some instances, the adhesive 733 may be an epoxy, glue, solder, or other suitable compound. In some variations, the substrate 724 and the interposer 734 may be mechanically connected.

Figure 8A:
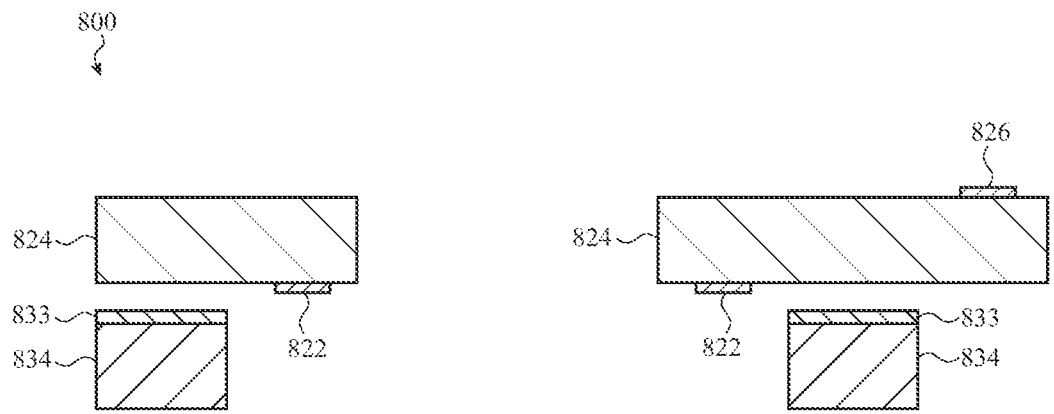
FIG. 8A shows a cross-sectional side view of another example substrate assembly and interposer prior to connecting the substrate and interposer as described herein.
Figure 8B:
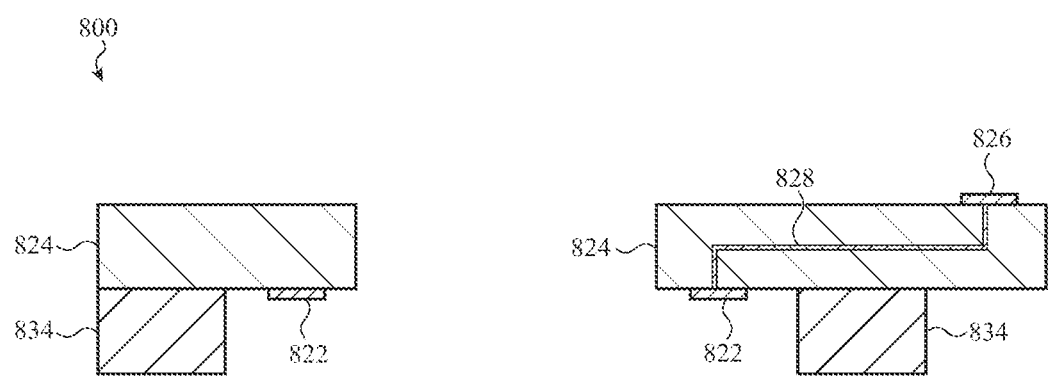
FIG. 8B shows a cross-sectional side view of the example substrate and interposer assembly after including wiring and connecting the substrate and interposer as described herein.

The interior and exterior electrical contacts 722, 726 are shown in FIGS. 7A and 7B as both being positioned on a front-facing side of the substrate, but it should be appreciated that in other instances the interior electrical contacts 722 and/or the exterior electrical contacts 726 may be positioned on a rear-facing side of the substrate. For example, FIGS. 8A and 8B show cross-sectional side views of a variation of a substrate assembly 800 having a substrate 824, interior electrical contacts 822, exterior electrical contacts 826, wiring 828, an interposer 834, and an adhesive 833. These components may be configured in any manner as described with respect to the corresponding components of the substrate assembly 700 of FIGS. 7A and 7B, except that the interior electrical contacts 822 and the exterior electrical contacts 826 are positioned on opposite sides of the substrate 824. In the variation shown in FIGS. 8A and 8B, the interior electrical contacts 822 are positioned on a rear-facing side of the substrate 824 and the exterior electrical contacts are positioned on a front-facing side of the substrate 824.

Figure 9A:
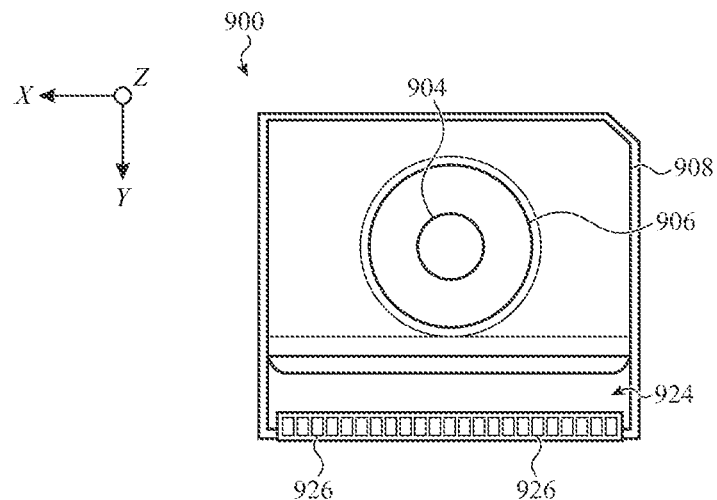
FIG. 9A shows a top view of an example camera module as described herein.
Figure 9B:
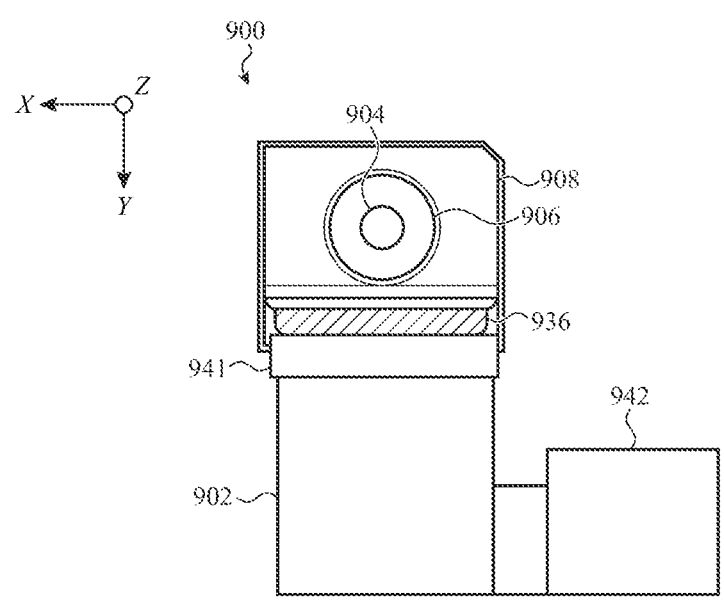
FIG. 9B shows a top view of an example camera module connected to a flexible printed circuit board as described herein.
Figure 9C:
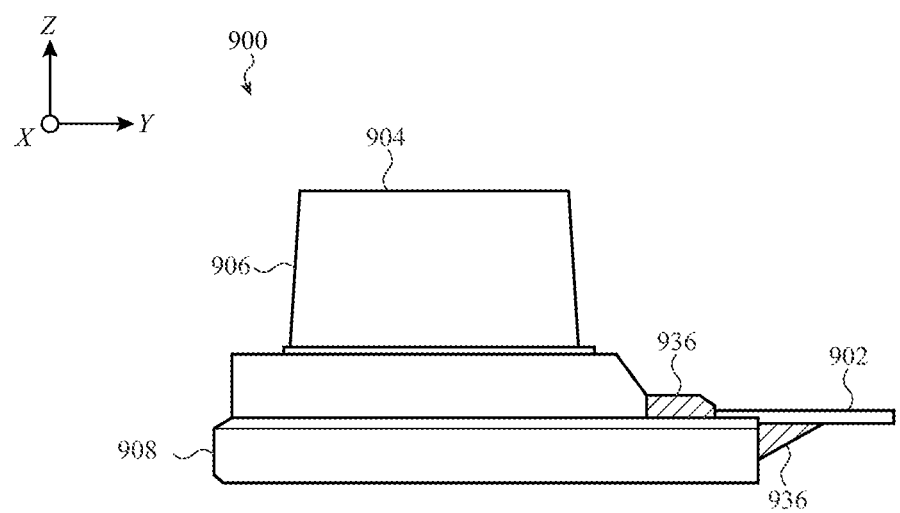
FIG. 9C shows a side view of an example camera module connected to a flexible printed circuit board as described herein.

FIGS. 9A-9C show a camera module 900 having electrical contacts 926 positioned on an exterior portion of a substrate assembly as described herein. Camera module 900 may include a lens array 904 and a set of housing elements (e.g., an upper housing element 906, and a lower housing element 908), which may be configured in any manner as described above with respect to the camera module 300 of FIGS. 3A and 3B and the camera module 400b of FIG. 4B. Additionally, camera module 900 may include a substrate assembly having a set of rigid substrates, such as one the substrate assemblies described herein with respect to FIGS. 5A-8B. As shown in FIG. 9A, a portion of a substrate 924 of the substrate assembly may form a ledge having a surface that defines an exterior surface of the camera module 900.

Additionally, the camera module 900 may include an internal cavity that is defined at least partially by the set of housing elements and at least partially by the set of rigid substrates. At least a portion of the substrate is positioned within the internal cavity to position another set of electrical contacts within the internal cavity. In some variations, a rigid substrate (e.g., substrate 924) of the set of rigid substrates may include both a first portion or a surface that is positioned within the interior cavity of the camera module 900 and a second portion that is positioned outside of the interior cavity or defines an exterior of the camera module 900. Exterior electrical contacts 926 may be positioned on a surface of the ledge portion of the substrate 924. The exterior electrical contacts 926 may extend beyond one or more housing elements of the set of housing elements (e.g., the upper housing element 906 and/or the lower housing element 908) by a distance (e.g., in the Y-axis direction), thereby allowing the substrate 924 to define the ledge on which the exterior electrical contacts 926 are positioned. This may allow for secure connection with an externally-connected flexible printed circuit board 902 (as shown in FIGS. 9B and 9C).

Specifically, a first end 941 of the flexible printed circuit board 902 may be mechanically coupled and electrically coupled to the camera module 900. A second end 942 of the flexible printed circuit board 902 may be mechanically coupled and electrically connected to other components of a device, for example, one or more processors 136 of device 100 as described with respect of FIGS. 1A-1C. In some variations, a reinforcement structure 936 may be used to help connect the camera module 900 to the flexible printed circuit board 902. The reinforcement structure 936 is a structure that is formed from an adhesive material. In some variations, the reinforcement structure 936 is a structure that is formed from another material that is attached to a portion of the substrate 924 and a portion of the flexible printed circuit board 902. The reinforcement structure may provide an additional connection point between the substrate 924 and the flexible printed circuit board 902 (e.g., in addition to the connection between the flexible printed circuit board 902 and the exterior electrical contacts 926), which may add mechanical integrity to the connection between the camera module 900 and the flexible printed circuit board 902. In some variations, the exterior electrical contacts 926 may comprise ACF pads arranged in a row (e.g., along the X-axis).

While the embodiments of the camera modules and associated substrate assemblies depicted in FIGS. 3A, 3B, 4B, and 5A-9C are shown as having a single set of exterior electrical contacts, it should be appreciated that any of these embodiments may include multiple sets of exterior electrical contacts. Multiple sets of exterior electrical contacts may allow external connections between a camera module and multiple flexible printed circuit boards, and/or between a camera module and multiple different regions of a single flexible printed circuit board.

Figure 10A:
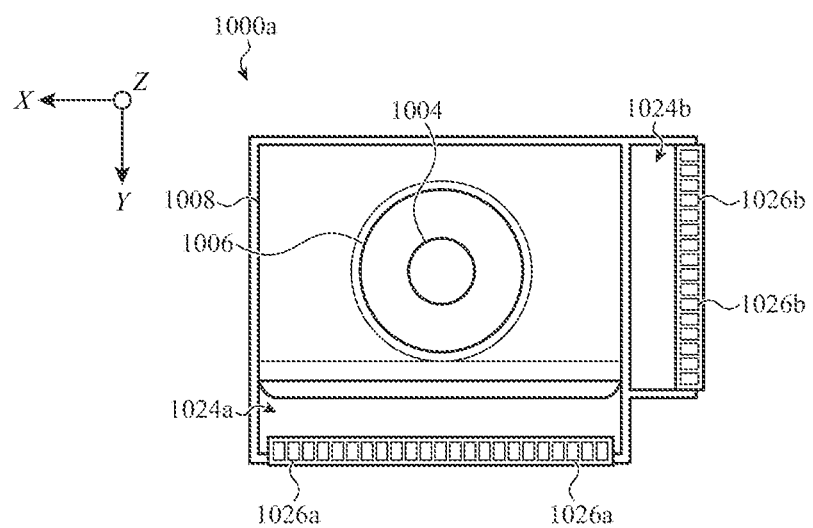
FIGS. 10A and 10B show top views of two example camera modules as described herein.

FIG. 10A shows a camera module 1000a having electrical contacts positioned on a substrate assembly at multiple exterior positions of the camera module 1000a. Camera module 1000a may include lens array 1004, a set of housing elements (e.g., an upper housing element 1006 and a lower housing element 1008) and a substrate assembly that includes a set of rigid substrates. These components may be configured in any manner as described with respect to the camera modules 300, 400b, and 900 of FIGS. 3A, 3B, 4B, and 9A-9C, respectively, except that the substrate assembly extends from two sides of the camera module 1000a to define two sets of exterior electrical contacts.

In the example shown in FIG. 10A, the substrate assembly includes a first substrate 1024a and a second substrate 1024b. A first portion of the first substrate 1024a extends from a first side of the set of housing elements (such that a second portion of the first substrate 1024a is positioned within an internal cavity defined in the camera module 1000a) to form a first ledge. The first ledge defines a first exterior surface of the camera module, and a first set of exterior electrical contacts 1026a may be positioned on a surface of the first ledge defined by the first substrate 1024a. Similarly, a first portion of the second substrate 1024b extends from a first side of the set of housing elements (such that a second portion of the second substrate 1024b is positioned within the internal cavity defined in the camera module 1000a) to form a second ledge. The second ledge defines a second exterior surface of the camera module, and a second set of exterior electrical contacts 1026b may be positioned on a surface of the second ledge.

In other variations, the first and second ledges may be defined by different portions of a single substrate (e.g., a first portion of the substrate forms the first ledge, and a second portion of the substrate forms the second ledge). In these variations, the first and second sets of exterior electrical contacts 1026a, 1026b are positioned on different portions of the same substrate. In some of these variations, a first ledge and a second ledge may be formed as a single contiguous ledge portion. In some variations, one or more additional substrates (e.g., a third substrate and a fourth substrate) may be included to define ledges on one or more additional sides of the camera module 1000a, on which additional sets of exterior electrical contacts may be positioned. These sets of exterior electrical contacts may be electrically connected to one or more sets of internal electrical contacts as discussed herein.

Figure 10B:
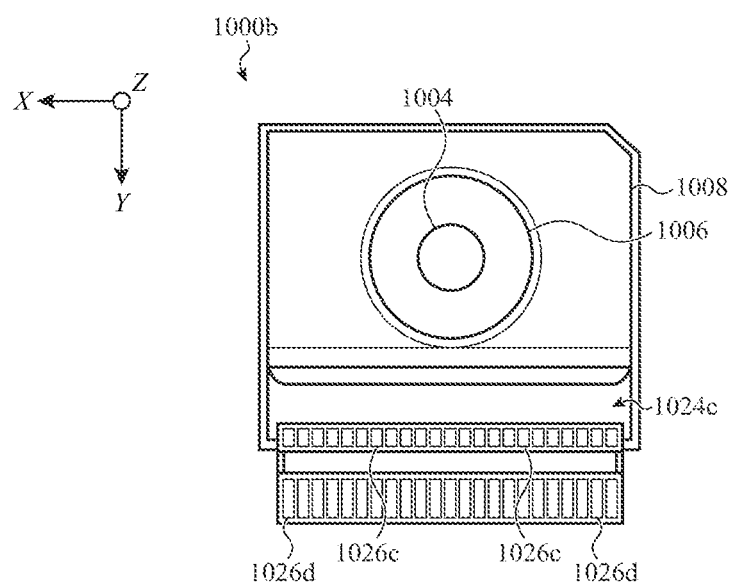

FIG. 10B shows a camera module 1000b having multiple rows of electrical contacts positioned on a substrate assembly that are external to an interior cavity of the camera module 1000b. Camera module 1000b may include a lens array 1004, a set of housing elements (e.g., an upper housing element 1006 and a lower housing element 1008) and a substrate assembly that includes a rigid substrate 1024c. These components may be configured in any manner as described with respect to the camera modules 300, 400b, 900, and 1000a of FIGS. 3A, 3B, 4B, 9A-9C, and 10A, respectively, except that the substrate assembly extends from a side of the camera module 1000b to define two sets of exterior electrical contacts.

A first portion of rigid substrate 1024c extends from a first side of the set of housing elements (such that a second portion of the rigid substrate 1024c is positioned within an internal cavity defined in the camera module 1000b) to form a ledge. The ledge defines one or more exterior surfaces of the camera module, and may include two sets of electrical contacts positioned on one or more surfaces of the ledge. For example, a first set of exterior electrical contacts 1026c may be positioned on a first section of a surface of the rigid substrate 1024c. A second set of exterior electrical contacts 1026d may be positioned on a different second section of a surface of the ledge portion of the rigid substrate 1024c. The first and second sections may be spaced apart sections on the same side of the rigid substrate 1024c, or may be sections of different sides (e.g., opposite sides) of the rigid substrate 1024c. While the sets of exterior electrical contacts 1026c, 1026d are shown in FIG. 10B as being positioned along a row, it should be appreciated that a given set of electrical contacts as described herein may be positioned in any suitable arrangement. For example, a given set of electrical contacts may be positioned in a staggered arrangement to facilitate routing to the individual electrical contacts.

In some variations, ACF pads corresponding to electrical contacts used for high-speed signals may be smaller, for example, to lower an associated capacitance. Conversely, relatively lower speed signals (e.g., power and control signals) may benefit from larger ACF pads. Accordingly, the individual contacts of the first set of exterior electrical contacts 1026c may have a different size that the individual contacts of the second set of exterior electrical contacts 1026d. In some variations, different sized ACF pads may be intermixed on a particular row or set of exterior electrical contacts. That is, in some variations, ACF pads may be sized or spaced differently based on the characteristics of the signal. In some variations, a single flexible printed circuit board may be externally electrically connected to both the first set of exterior electrical contacts 1026a and the second set of exterior electrical contacts 1026b. In other variations, different flexible printed circuit boards may be externally electrically connected, respectively, to the first and second sets of exterior electrical contacts 1026c, 1026d.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A camera module comprising:
   a set of housing elements that at least partially defines an interior cavity;
   a set of lens elements;
   an image sensor; and
   a substrate assembly comprising:
      a set of rigid substrates;
      a first set of electrical contacts positioned on a first surface of the set of rigid substrates; and
      a second set of electrical contacts positioned on a second surface of the set of rigid substrates; wherein:
   the substrate assembly at least partially defines an aperture;
   the image sensor is positioned within the interior cavity to receive light through the set of lens elements and the aperture;
   the substrate assembly is positioned such that a first portion of the substrate assembly is positioned inside the interior cavity and a second portion of the substrate assembly extends outside of the interior cavity;
   the image sensor is connected to the first set of electrical contacts within the interior cavity; and
   the second set of electrical contacts is positioned outside of the interior cavity.

2. The camera module of claim 1, further comprising:
   a flexible printed circuit board connected to the second portion of the substrate assembly and electrically connected to the second set of electrical contacts.

3. The camera module of claim 1, wherein:
   each electrical contact of the first set of electrical contacts is electrically connected to a corresponding electrical contact of the second set of electrical contacts.

4. The camera module of claim 1, wherein:
   the substrate assembly comprises wiring to provide electrical connectivity from the first set of electrical contacts to the second set of electrical contacts.

5. The camera module of claim 1, wherein:
   the first surface faces a first direction and the second surface faces the first direction.

6. The camera module of claim 1, wherein:
   the first surface faces a first direction and the second surface faces a second direction different from the first direction.

7. The camera module of claim 1, wherein:
   the first surface and the second surface are part of a same rigid substrate of the set of rigid substrates.

8. The camera module of claim 1, wherein:
   the first surface is part of a first rigid substrate of the set of rigid substrates; and
   the second surface is part of a second rigid substrate of the set of rigid substrates different from the first rigid substrate.

9. The camera module of claim 1, further comprising:
   a stiffener positioned distal to the set of lens elements and proximal to the set of rigid substrates with respect to an optical axis of the camera module.

10. A camera module comprising:
    a set of housing elements that at least partially defines an interior cavity;
    a set of lens elements;
    an image sensor;
    a substrate assembly comprising:
       a set of rigid substrates;

a first set of electrical contacts positioned on a first surface of the set of rigid substrates; and
a second set of electrical contacts positioned on a second surface of the set of rigid substrates; and
an interposer connected to the substrate assembly;
wherein:
the substrate assembly at least partially defines an aperture;
the image sensor is positioned within the interior cavity to receive light through the set of lens elements and the aperture;
the substrate assembly is positioned such that a first portion of the substrate assembly is positioned inside the interior cavity and a second portion of the substrate assembly extends outside of the interior cavity;
the image sensor is connected to the first set of electrical contacts within the interior cavity; and
the second set of electrical contacts is positioned outside of the interior cavity.

11. The camera module of claim 10, wherein:
the set of rigid substrates has a stiffness greater than a stiffness of the interposer.

12. The camera module of claim 10, wherein:
the interposer is connected to the first portion of the substrate assembly and is positioned inside or partially forms the interior cavity.

13. The camera module of claim 10, wherein:
the first surface faces a first direction and the second surface faces a second direction that is opposite the first direction.

14. The camera module of claim 10, wherein:
the second surface has a plane that is perpendicular to an optical axis of the camera module.

15. A system comprising:
a camera module comprising:
  a set of housing elements that at least partially defines an interior cavity;
  a set of lens elements;
  an image sensor; and
  a substrate assembly comprising:
    a set of rigid substrates;
    a first set of electrical contacts positioned on a first surface of the set of rigid substrates; and
    a second set of electrical contacts positioned on a second surface of the set of rigid substrates;
  a flexible printed circuit board; and
  at least one processor configured to receive signals from the image sensor;
wherein:
  the substrate assembly at least partially defines an aperture;
  the image sensor is positioned within the interior cavity to receive light through the set of lens elements and the aperture;
  the substrate assembly is positioned such that a first portion of the substrate assembly is positioned inside the interior cavity and a second portion of the substrate assembly extends outside of the interior cavity;
  the image sensor is connected to the first set of electrical contacts within the interior cavity;
  the second set of electrical contacts is positioned outside of the interior cavity; and
  the flexible printed circuit board is connected to the second portion of the substrate assembly and electrically connected to the second set of electrical contacts.

16. The system of claim 15, further comprising:
a reinforcement structure that contacts the second portion of the substrate assembly and the flexible printed circuit board.

17. The system of claim 15, wherein:
the camera module further comprises an interposer that is positioned between the substrate assembly and at least one of the set of housing elements.

18. The system of claim 15, wherein:
the substrate assembly further comprises a third set of electrical contacts positioned on a third surface of the set of rigid substrates; and
the third set of electrical contacts is positioned outside of the interior cavity.

19. The system of claim 18, further comprising:
a second flexible printed circuit board that is connected to the second portion of the substrate assembly and electrically connected to the third set of electrical contacts.

* * * * *